(12) United States Patent
Bauchspies (10) Patent No.: US 7,970,186 B2
(45) Date of Patent: Jun. 28, 2011

(54) SYSTEM, METHOD AND COMPUTER PROGRAM PRODUCT FOR FINGERPRINT VERIFICATION

(76) Inventor: Roger A. Bauchspies, Morgan Hill, CA (US)

( * ) Notice: Subject to any disclaimer, the term of this patent is extended or adjusted under 35 U.S.C. 154(b) by 0 days.

(21) Appl. No.: 12/651,834

(22) Filed: Jan. 4, 2010

(65) Prior Publication Data

US 2010/0150411 A1   Jun. 17, 2010

Related U.S. Application Data

(62) Division of application No. 10/897,316, filed on Jul. 22, 2004, now Pat. No. 7,643,660.

(51) Int. Cl.
*G06K 9/00* (2006.01)
(52) U.S. Cl. ........................................ 382/125
(58) Field of Classification Search .................. 382/115, 382/124–125, 209, 218, 312; 283/69; 340/5.52, 340/5.53; 713/186; 902/3, 5
See application file for complete search history.

(56) References Cited

U.S. PATENT DOCUMENTS

| | | | | |
|---|---|---|---|---|
| 5,799,098 A * | 8/1998 | Ort et al. | | 382/125 |
| 6,241,288 B1 * | 6/2001 | Bergenek et al. | | 283/67 |
| 6,836,554 B1 * | 12/2004 | Bolle et al. | | 382/116 |
| 7,027,626 B2 * | 4/2006 | Funada | | 382/125 |
| 7,142,699 B2 * | 11/2006 | Reisman et al. | | 382/124 |

* cited by examiner

*Primary Examiner* — Daniel G Mariam
(74) *Attorney, Agent, or Firm* — Patent Law Offices of Michael E. Woods (57) ABSTRACT

A computer program product comprising a computer readable medium carrying program instructions for verifying a fingerprint when executed using a computing system, the executed program instructions executing a method, the method: producing a test image of a fingerprint-under-test; producing a test ridge map from the test image and a reference ridge map from each of one or more reference fingerprint images; extracting fingerprint points of interest from the ridge maps; screening candidate reference ridge maps based upon a correspondence between the points of interest from the reference ridge maps and the points of interest from the test ridge map wherein the correspondence includes a first threshold and one or more candidate ridge maps having the correspondence within the first threshold are included in a set of candidate ridge maps; comparing local ridge data surrounding one or more points of interest of the test ridge map within a second threshold with local ridge data surrounding corresponding one or more points of interest of each of the test ridge maps in the set of candidate ridge maps; and asserting a comparison signal responsive to a correspondence between the local ridge data of the test ridge map and the local ridge data from one or more candidate ridge maps of the set of candidate ridge maps.

4 Claims, 11 Drawing Sheets

SYSTEM, METHOD AND COMPUTER PROGRAM PRODUCT FOR FINGERPRINT VERIFICATION

CROSS REFERENCE TO RELATED APPLICATIONS

This application is a division of U.S. patent application Ser. No. 10/897,316 filed 22 Jul. 2004 (to be issued as U.S. Pat. No. 7,643,660) which is related to a patent application Ser. No. 10/897,310 (now U.S. Pat. No. 7,512,256), entitled "SYSTEM, METHOD, AND COMPUTER PROGRAM PRODUCT FOR IMAGE FEATURE IDENTIFICATION" and to a copending patent application Ser. No. 10/897,965, entitled "SYSTEM, METHOD, AND COMPUTER PROGRAM PRODUCT FOR IMAGE COMPRESSION/DECOMPRESSION" both filed on even date herewith. These applications are expressly incorporated by reference in their entirety for all purposes.

BACKGROUND OF THE INVENTION

The present invention relates generally to automatic machine-implemented fingerprint recognition systems, and more specifically to a system, method and computer program product for verifying a fingerprint-under-test against a set of reference fingerprints.

The use of biometrics as an aid to confirming authorization for access to various types of resources or locations has been increasing. Biometric systems measure various unique or nearly unique characteristics of a person's body to assist in confirming identity, and consequently in authorizing an access requested by the person. Common body characteristics used in these systems include fingerprints and eye retinal patterns.

Fingerprints are believed by many to be unique or nearly unique across the population base. Fingerprints include ridges/furrows that define a complex pattern. Each fingerprint typically includes many pattern features (including features referred to as minutia) that are cognizable by detection systems. These minutia serve as the basis by which many fingerprint biometric systems judge a match between a fingerprint-under-test and a reference fingerprint. That is, when the system determines that there is a sufficient match between the fingerprint-under-test and the reference, the system has determined that there are enough matching minutia between the two.

There are two common metrics used to measure how accurate these systems are when comparing the fingerprint-under-test with one or more reference fingerprints. These metrics are a false acceptance ratio (FAR) and a false rejection ratio (FRR). These metrics are dependent upon many factors including the implementation of the sensing system and the type of fingerprint features measured. In general, the FAR and the FRR of conventional systems are inversely related resulting in balancing the performance of these systems, and limiting the practicably achievable accuracy.

Further, processing multitudes of minutia information for multiple fingerprints using conventional systems requires significant processing resources and are often still viewed as taking excessive amounts of time. The significant processing resources needed relegate many solutions to systems that are tethered to desktop computer systems or other substantial processing system. However, there exist many uses for these systems that cannot be used in conjunction with desktop computer systems.

What is needed is a fingerprint verification system that offers improved accuracy and processing efficiency while preserving an ability of these systems to be enabled using the often more limited processing resources of a stand-alone or embedded computing platform while desirably being cost-effective.

BRIEF SUMMARY OF THE INVENTION

Disclosed is an apparatus, system and computer program product for a fingerprint verification system. The apparatus includes a fingerprint source for producing a test image of a fingerprint-under-test; and a processing unit, coupled to the fingerprint source, for: producing a test ridge map from the test image and a reference ridge map from each of one or more reference fingerprint images; extracting fingerprint points of interest from the ridge maps; screening candidate reference ridge maps based upon a correspondence between the points of interest from the reference ridge maps and the points of interest from the test ridge map wherein the correspondence includes a first threshold and one or more candidate ridge maps having the correspondence within the first threshold are included in a set of candidate ridge maps; comparing local ridge data surrounding one or more points of interest of the test ridge map within a second threshold with local ridge data surrounding corresponding one or more points of interest of each of the test ridge maps in the set of candidate ridge maps; and asserting a comparison signal responsive to a correspondence between the local ridge data of the test ridge map and the local ridge data from one or more candidate ridge maps of the set of candidate ridge maps. The method for verifying a fingerprint against a set of reference fingerprints includes producing a test image of a fingerprint-under-test; producing a test ridge map from the test image and a reference ridge map from each of one or more reference fingerprint images; extracting fingerprint points of interest from the ridge maps; screening candidate reference ridge maps based upon a correspondence between the points of interest from the reference ridge maps and the points of interest from the test ridge map wherein the correspondence includes a first threshold and one or more candidate ridge maps having the correspondence within the first threshold are included in a set of candidate ridge maps; comparing local ridge data surrounding one or more points of interest of the test ridge map within a second threshold with local ridge data surrounding corresponding one or more points of interest of each of the test ridge maps in the set of candidate ridge maps; and asserting a comparison signal responsive to a correspondence between the local ridge data of the test ridge map and the local ridge data from one or more candidate ridge maps of the set of candidate ridge maps. A computer program product including a computer readable medium carrying program instructions for verifying a fingerprint when executed using a computing system, the executed program instructions executing a method, the method: producing a test image of a fingerprint-under-test; producing a test ridge map from the test image and a reference ridge map from each of one or more reference fingerprint images; extracting fingerprint points of interest from the ridge maps; screening candidate reference ridge maps based upon a correspondence between the points of interest from the reference ridge maps and the points of interest from the test ridge map wherein the correspondence includes a first threshold and one or more candidate ridge maps having the correspondence within the first threshold are included in a set of candidate ridge maps; comparing local ridge data surrounding one or more points of interest of the test ridge map within a second threshold with local ridge data surrounding corresponding one or more points of interest of each of the test ridge maps in the set of candidate ridge maps; and asserting a comparison signal responsive to a correspondence between the local ridge data of the test ridge map and the local ridge data from one or more candidate ridge maps of the set of candidate ridge maps.

The preferred embodiment of the present invention is a fingerprint verification system that offers improved accuracy and processing efficiency while preserving an ability to be enabled using the often more limited processing resources of a stand-alone or embedded computing platform while desirably being cost-effective. Further, the present invention is able to set a desired level of security (false acceptance rate) while preserving acceptable performance (false rejection rates). The preferred embodiment uses feature points of interest common between the fingerprint-under-test and a reference fingerprint to screen candidate reference fingerprints for further analysis. The candidate fingerprints are ordered when screened so that a candidate having a greater likelihood of passing is higher on a list than one less likely. Candidate fingerprints are analyzed in detail by finding a primary feature near a center of the image and surveying local ridge data surrounding the primary feature and matching a candidate fingerprint when the local ridge data matches that surrounding the primary feature of the fingerprint-under-test. Desired levels of security are achieved by matching suitable quantities of local ridge data.

The novel features which are characteristic of the invention, as to organization and method of operation, together with further objects and advantages thereof, will be better understood from the following description considered in connection with the accompanying drawings in which one or more preferred embodiments of the invention are illustrated by way of example. It is to be expressly understood, however, that the drawings are for the purpose of illustration and description only and are not intended as a definition of the limits of the invention. These drawings include the following figures, with like numerals indicating like parts.

DETAILED DESCRIPTION OF THE INVENTION

The present invention relates to a fingerprint verification system that offers improved accuracy and processing efficiency while preserving an ability of these systems to be enabled using the often more limited processing resources of a standalone or embedded computing platform while desirably being cost-effective. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

For purposes of the present discussion of a fingerprint verification process in which a fingerprint-under-test is compared against a set of candidate fingerprints, with a comparison signal produced based upon the results of any comparisons, the term fingerprint is taken in its broadest sense. Fingerprint includes a map of contrasting amplitude element and as such, the ridge/furrow pattern on human fingers is included as a fingerprint. Additionally, zebra stripe patterns, retinal vein patterns, or other map of contrasting elements having sufficiently long elements and points of interest coupled to these elements.

Also, to simplify the present discussion, the discussion will emphasize how to make and use, as well as the best mode, of a fingerprint verification engine/process for use in an embedded system. The nature, type and implementation details of the embedded system are not discussed in much detail as the preferred embodiment may be adapted for use in a very wide range of systems. The embedded system determines when to test a fingerprint, when to write/remove reference fingerprints into/from nonvolatile memory, what level of correspondence between a test fingerprint and a reference fingerprint is required, and what happens with a comparison signal produced from the system when a fingerprint matches a particular reference fingerprint. In a simple implementation, the preferred embodiment returns a pass signal (along with a quality signal measuring a correspondence of the match) when a local ridge information of a fingerprint-under-test sufficiently matches corresponding local ridge information of a candidate reference fingerprint.

Figure 1:
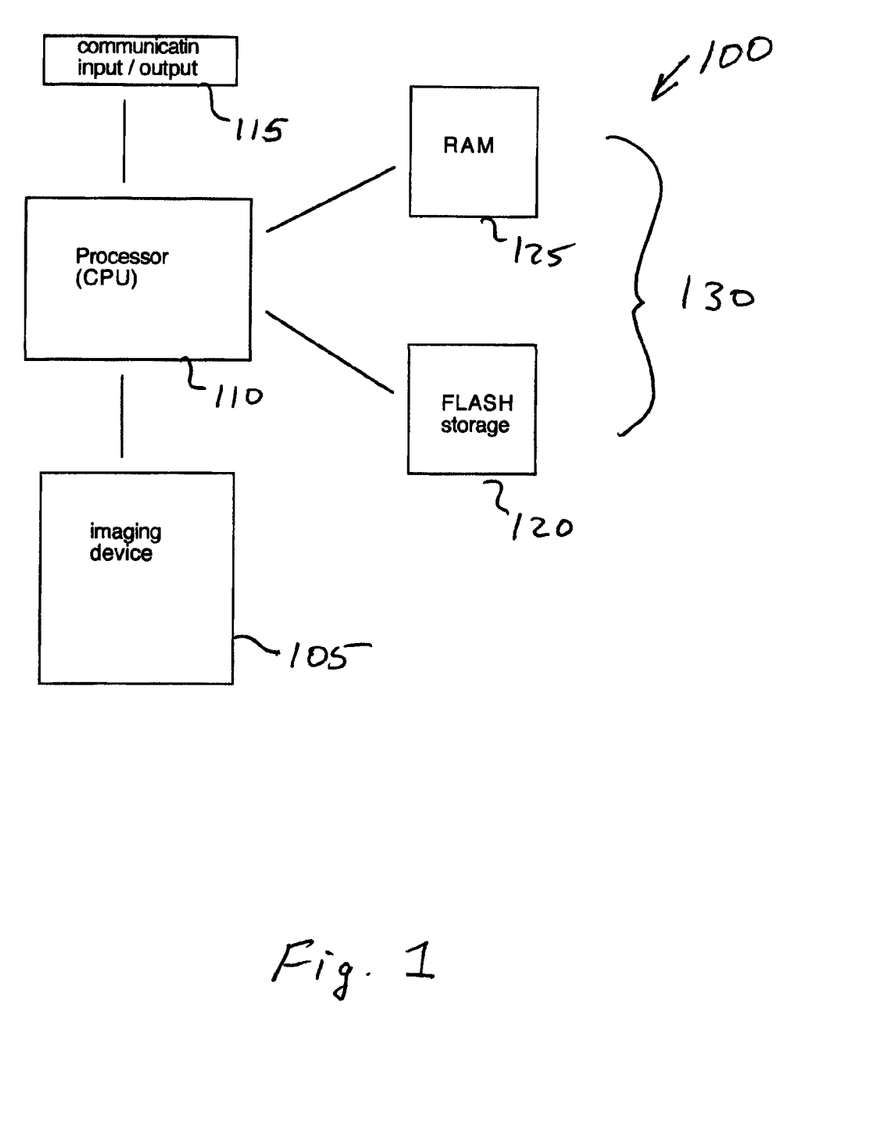
FIG. 1 is a block schematic diagram of a preferred embodiment for a fingerprint verification system.

FIG. 1 is a block schematic diagram of a preferred embodiment for a fingerprint verification system 100. System 100 includes an imaging device 105, a processor 110, an input/ output (I/O) system 115, a nonvolatile memory 120 and a RAM memory 125, with memory 120 and memory 125 collectively defining a memory system 130. System 100 is described, in the preferred embodiment, as fingerprint verification system as opposed to other type of fingerprint checking/matching system. In a fingerprint verification system, the system attempts to measure a correspondence between a test fingerprint and reference fingerprints (one-on-one) in order to confirm identify of the test to the reference database. This is contrasted with an identification system that determines which reference the test has been matched to. Typically, a verification system may be used as an identification system if a decrease in power/speed is acceptable, given analogous resources.

System 100 may function as a basic computer in implementing the present invention for accessing and processing fingerprints, fingerprint images, and ridge maps as further described below. Processor 110 may include one or more central processing units (CPUs), such as one of the PC microprocessors or workstations, e.g. RISC System/6000 (RS/6000) (RISC System/6000 is a trademark of International Business Machines Corporation) series available from International Business Machines Corporation (IBM), is provided and interconnected to various other components, such as by a system bus.

Imaging device 105 produces an image of a fingerprint; either directly (i.e., it is a sensor or imager) or it accesses a data structure or memory to obtain the image. The image may be of a reference fingerprint or of a fingerprint-under-test. System 100 is a general purpose computer having a large number of suitable implementations for accessing and processing resources fingerprints, fingerprint images, and ridge maps. Sensors that may be used with system 100 include charge-coupled devices (CCD), complementary metal oxide semiconductor (CMOS), capacitive, or other image sensing devices, such as those available from Fujitsu, Atmel, Athentec, ST Micro for example. Image arrays may be relatively small (e.g., 128×128 pixels to a more common CIF size of 352×288 pixels or larger), each pixel having a pixel depth of but not limited to eight bits. System 100 uses a fingerprint image produced from source 105. In some cases, system 105 may preprocess images, such as performing image keystone corrections (a geometric correction used to account for optical distortions associated with optical/prism based systems when returning an image size proportionate to fingerprint size or image stitching to assemble an image taken in bands as a finger is 'swiped' across the sensor.

An operating system runs on processor 110, providing control and coordinating the functions of the various components of the system. The operating system may be one of the commercially available operating systems such as the AIX 6000 operating system or OS/2 operating system available from IBM (AIX 6000 and OS/2 are trademarks of IBM); Microsoft's Windows, Apple's MacOS, as well as UNIX and AIX operating systems, though the preferred embodiment uses a custom control for providing minimal, tailored functions. Custom programs, controlled by the system, are moved into and out of memory. These programs include the program of the present invention to be subsequently described in combination with analyzing and comparing fingerprint-related data. Source 105, I/O communication system 115, and memory system 130 is coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices are also connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. The system may contain a removable memory component for transferring images, maps, instructions or programs.

In use, system 100 compares a live finger to a known database in memory 130. The databases of conventional system typically includes one reference from each finger. The preferred embodiment stores multiple references from each finger. When comparing a live finger against the database, system 100 sets the security level higher then for a one to one correspondence and tests the live finger against multiple references from the same finger. System 100 compares reference maps from the same fingerprint against each other using heightened security, and compares maps from one finger against other references supposedly from other fingers to verify that a finger is not referenced multiple times (though each finger has multiple maps).

For example; if two references are stored for a given finger using a false accept rate (FAR) of 1/2,000, then testing a live finger against the two stored references effectively accomplishes a final false accept rate of 1/1,000.

An advantage in doing so is that the system's false reject rate (FRR) falls well below a level of other conventional systems, e.g. a 1/100 claimed by many conventional algorithms). Empirically, for example; at a false accept rate of one in 1,000, system 100 has a false reject rate of 1 percent. At a false accept rate of one in 2,000, system 100 has a false reject rate of 1.1 percent. At a false accept rate of one in 10,000 system 100 has a false reject rate of 1.5 percent. At a false accept rate of one in 100,000, system 100 has a false reject rate of 2 percent.

While other algorithms claim a low FRR at the 1/1000 FAR, system 100 maintains a relatively low FRR as FAR goes to 1/10000 to 1/1000000 and beyond, making system 100 operate in a relatively flat portion of a FRR/FAR curve.

System 100 has an advantage not necessarily in processing database statistics, but an advantage in actual use. System 100 stores more templates for each user and sets its test methods to a higher FAR, system 100's ability to successfully match live fingers against stored references is much better than measured statistics and much better than what other conventional algorithms do. It is better than measured statistics partially because known database samples are too limited to test the performance, being established for conventional systems.

Figure 2:
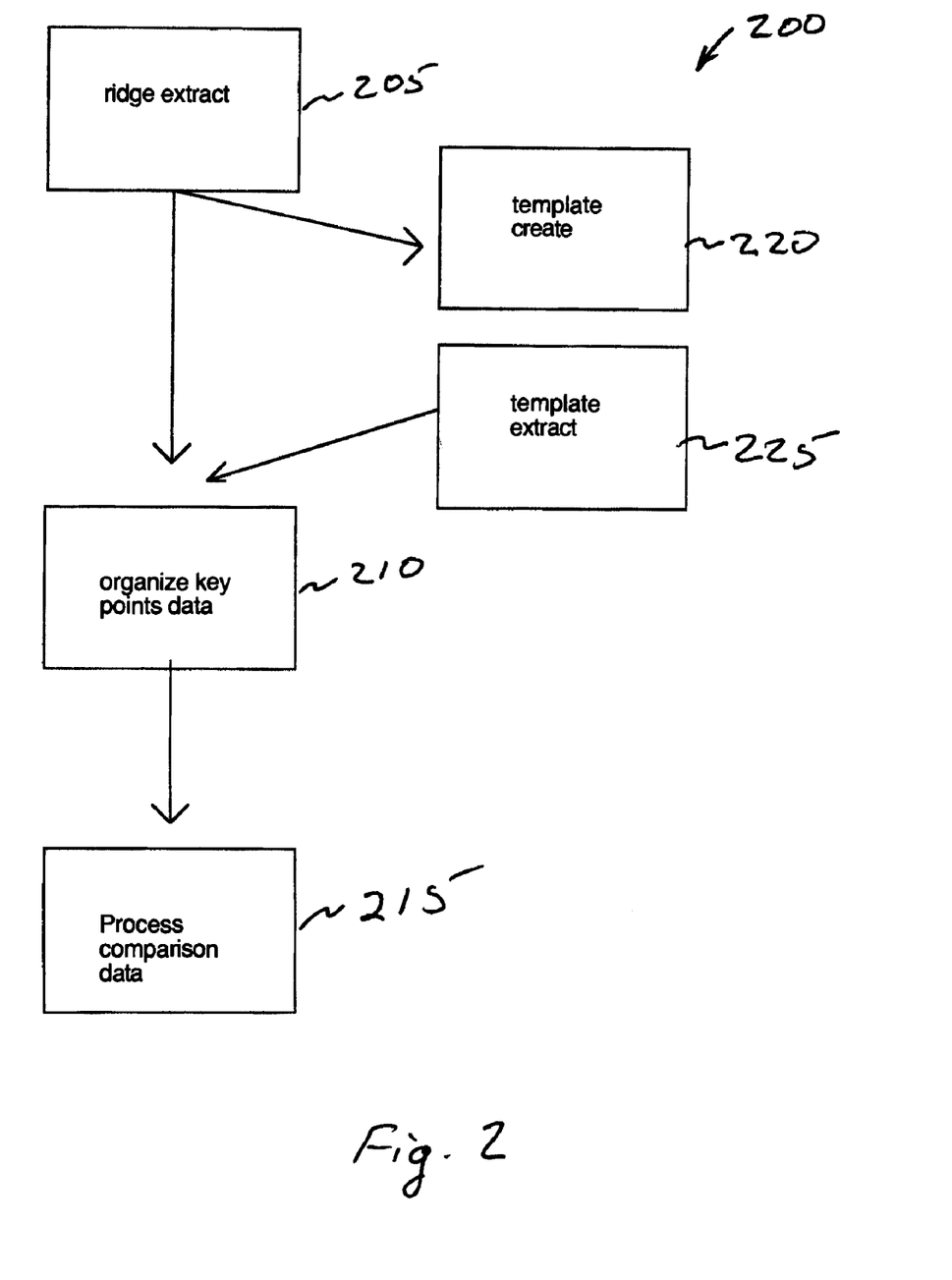
FIG. 2 is a flow diagram of a preferred embodiment for a fingerprint verification process.

FIG. 2 is a flow diagram of a preferred embodiment for a fingerprint verification process 200. Process 200, executed by system 100 for example, includes three main subprocesses: step 205 is a ridge extraction process; step 210 is an organize key points data subprocess following step 205; and step 215 is a compare data subprocess following step 210. Process 200 preferably also includes template processing steps: a template create step 220 and a template extraction step 225.

System 100 uses much of the available ridge data for image comparison. Preparation for comparison is step 205 while actual image verification has two basic steps: organize step 210 and compare step 215.

Ridge extraction step 205 creates a ridge map from an image. There are many ways that an image may be processed to produce the ridge map, some of which are dependent upon the type of sensor, type of image, and resources of system 100. A preferred ridge map extraction process is explained further in the related a copending patent application Ser. No. 10/897,310 (now U.S. Pat. No. 7,512,256), entitled "SYSTEM, METHOD, AND COMPUTER PROGRAM PRODUCT FOR IMAGE FEATURE IDENTIFICATION" and filed on even date herewith.

In the preferred embodiment, reference images produced from sensor 105 have ridge maps extracted and templates made from the maps are stored efficiently into memory system 130 as encrypted templates for security and efficient use of memory. When the references are stored as templates, system 100 produces appropriate ridge maps from the templates for use. The optional templates and encryption\decryption systems are explained further in the related copending patent application Ser. No. 10/897,965, entitled "SYSTEM, METHOD, AND COMPUTER PROGRAM PRODUCT FOR IMAGE COMPRESSION/DECOMPRESSION" and filed on even date herewith. Reference ridge maps and/or templates from the reference ridge maps are stored in FLASH memory 120 for long term storage, and moved into RAM 125 for processing.

In general, just as one would with an image on a piece of paper, process 205 overlays one image buffer on top of an original image for the extracted ridge data. (the overlay buffer may actually be a multiple of source image. For example: the overlay may be a 2:1 ratio in size.) Step 205 steps across the image array looking for a ridge element to follow. Upon finding a ridge element, step 205 follows it in both directions (most probably the starting point is not a ridge end point). Step 205 "draws" an image of the ridge on the overlay image buffer pixel by pixel. Step 205 repeats stepping across the image array looking for new ridges. The preferred embodiment for step 205 employs a 'ridge following' technique. Many conventional fingerprint systems employ a Fast Fourier Transform (FFT) or other mathematical smoothing model followed by a ridge thinning process. With the ridge following method, step 205 bypasses the processor intensive FFT and the ridge thinning steps.

There are many systems for extracting ridge data from an image. For the preferred embodiment, the ridge extraction is the ridge following process. Details of the ridge following system are disclosed in the related patent application incorporated herein. System 100 uses a ridge following technique because: (a) faster image processing; (b) ability to define ridges with very little ridge to valley definition; (c) eliminates ridge thinning step; and (d) self healing of cracks and gaps.

While the preferred embodiment anticipates that other ridge map formation processes are possible, it is preferable that ridge map formation be compatible between ridge map formation of reference ridge maps and a ridge map from an image of a fingerprint-under-test. It may be that the only sufficiently compatible processing will be achieved using virtually the same mapping for the test image as the reference image(s). However, it may not be a requirement for successful operation for all implementations and embodiments.

Figure 3:
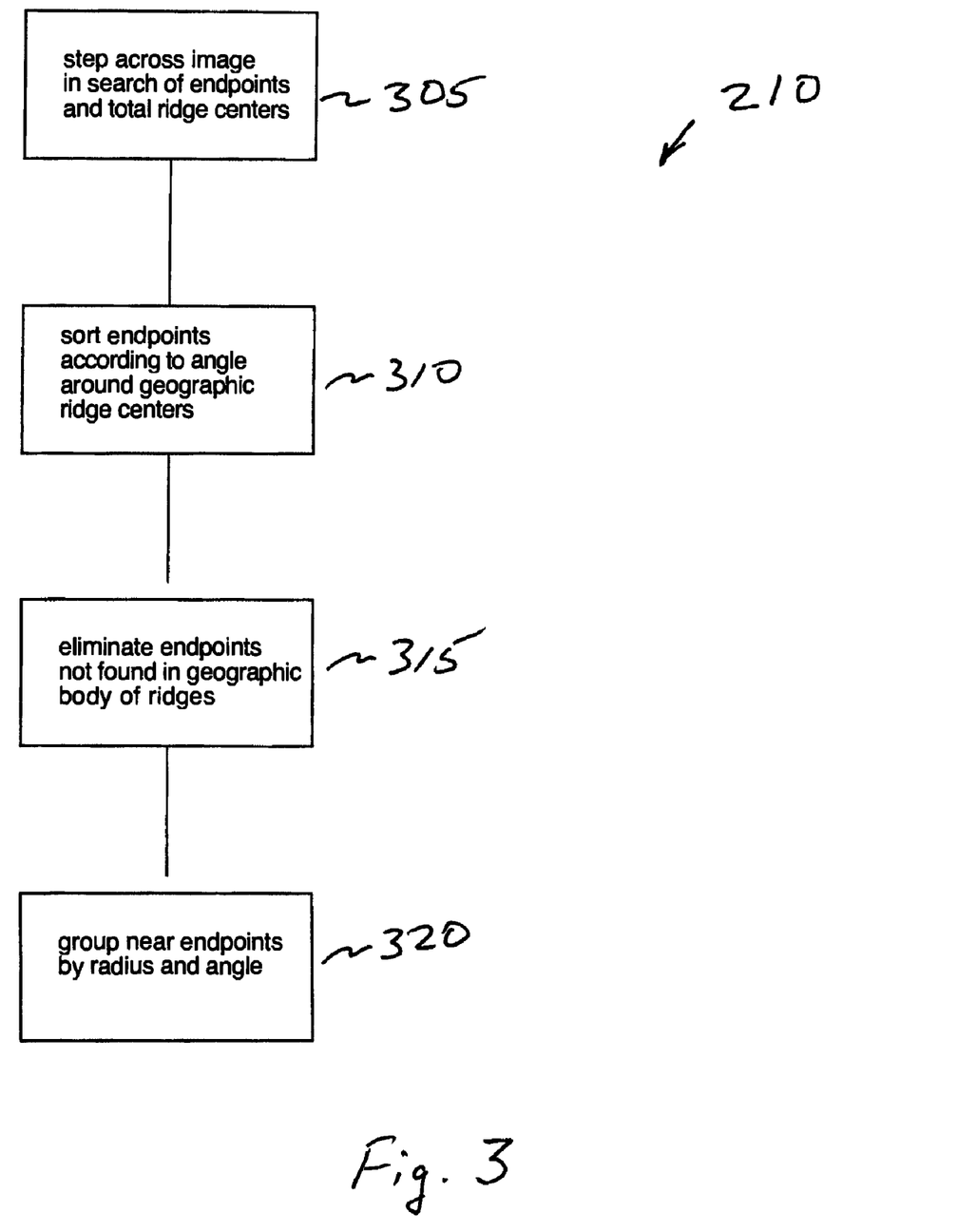
FIG. 3 is a flow diagram for a preferred embodiment for the organize subprocess shown in FIG. 2.

FIG. 3 is a flow diagram for a preferred embodiment for the organize subprocess step 210 shown in FIG. 2. Step 210 includes four substeps: a search substep 305, a sort substep 310, an eliminate substep 315 and a group substep 320.

Substep 305 scans a ridge map for ridge endpoints, and collects the endpoints into an array list. Concurrently, substep 305 sums all of the x and y coordinates of every ridge point to arrive at a ridge map center.

Substep 310 calculates, from the ridge map center, an angle of each ridge endpoint in relation to the ridge image center point and an orthogonal x-y axis established for the ridge map.

Substep 315 then sorts the list of ridge end points according to its angle (ascending or descending). Substep 315 calculates a radius of each ridge end point from the ridge map center point. Next, substep 315 eliminates from consideration all ridge end points at the outer perimeter of the ridge image because these end points are often caused by the loss of finger contact with the imaging device and are not true points of interest such as, for example, an end of ridge or a ridge intersection. Outer endpoints are eliminated by examining a endpoint and the nearest neighbor endpoint from the angularly sorted endpoint list. When the endpoint is greater than d % where d % can be for example 90% of the maximum endpoint radius of the n nearest neighbors.

Substep 320, for each remaining ridge endpoint (including all endpoints in the body of the image but not the perimeter), follows each ridge for a radius of m pixels (usually m is 12 to 16 pixels in length) and calculates the angle the ridge projects from the endpoint in the Cartesian plane. Any ridge not m pixels in length is disregarded. Next, substep 320 assembles a cluster of n (usually n is about equal to 32) nearest neighbor endpoints from a search of all endpoints. The cluster of nearest neighbor endpoints is sorted according to the distance between the two endpoints, usually the closer points are at the list beginning. Consequently, system 100 now has available information to calculate the angle to the orthogonal x-y axis of the cluster center endpoint's projection, the angle of the neighbor to the cluster center endpoint's projection, and the angle of the neighbor ridge projection angle in reference to the cluster center endpoint ridge projection angle. This is important in the preferred embodiment because now all angular data is independent of the orthogonal and is in relative terms to any given endpoint (Polar coordinates relative to the given endpoint.) For the purpose of fingerprint recognition this means no rotational limits or speed penalty for any fingerprint processing. Now all data is in relative not absolute terms and yet system 100 still retains the original orthogonal based ridge map data.

It is known to calculate angles by well known trigonometric functions. However, on a computer processor, trigonometric functions are very slow. To avoid slowness, the preferred embodiment determines angles by reducing the trigonometric calculations to the fundamental math and a special case lookup table which reduces the angle retrieval to several computer cycles and a small memory footprint for the lookup table. System 100 performs all of these without the use of floating point numbers.

Calculating a radius requires a square root. Square roots are also very slow on computer processors. The preferred embodiment avoids this problem by special case lookup tables and/or special case calculations. System 100 performs all of these without the use of floating point numbers.

Figure 4:
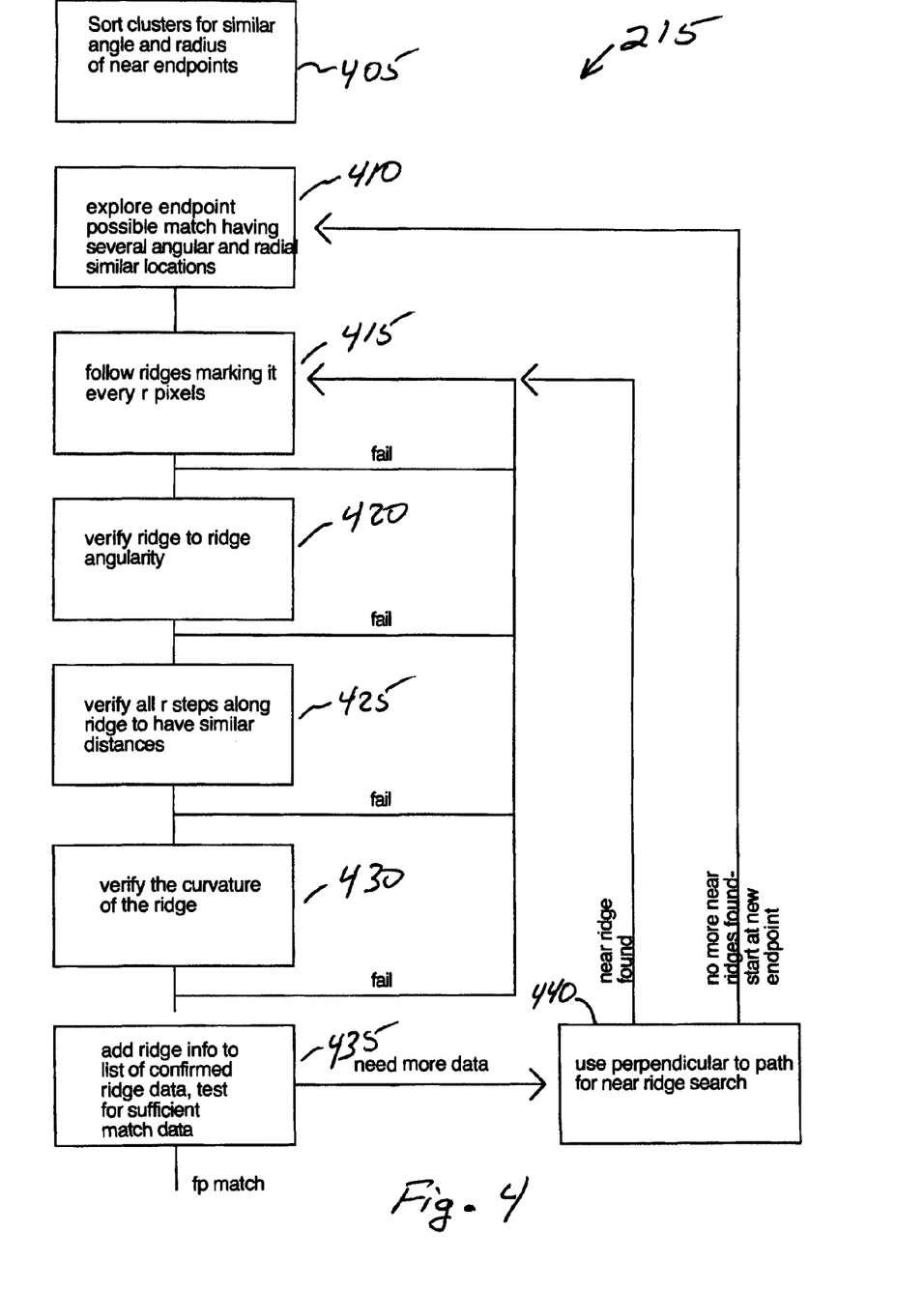
FIG. 4 is a flow diagram for a preferred embodiment for the comparison subprocess shown in FIG. 2.

FIG. 4 is a flow diagram for a preferred embodiment for the comparison step 215 shown in FIG. 2. Step 215 compares a ridge map produced from a fingerprint-under-test against each of a set of candidate reference ridge maps. Each ridge map of the set of candidate reference ridge map is compared against the ridge map from the fingerprint-under-test by finding a sufficient level of correspondence between local ridge data surrounding corresponding points of interest. When the correspondence between one candidate reference ridge map and the ridge map of the fingerprint-under-test exceeds a predetermined threshold, then the fingerprint-under-test has been verified. By determining the quantity of local ridge data that corresponds between maps, system 100 sets the FAR/FRR for the particular implementation. Application of process 200 to known sample databases using different parameters for system 100 permits calibration/determination of system 100 FAR/FRR.

Comparison step 215 includes the following substeps: a sort substep 405 (also referred to herein as screening), an explore substep 410, a follow substep 415, an angularity verify substep 420, a distance verify substep 425, a curvature verify substep 430, a matching substep 435, and a ridge search substep 440.

Comparison step 215 begins with inputs of the two maps of ridge data and the organized key points data from each of the ridge maps.

Sort substep 405 compares, within a cluster from each map, every ridge endpoint from key points to the endpoints from the opposing map data by searching all near neighbors for similar radii, angle to cluster projection and angle of near neighbor's projection to cluster center projection. As explained above, this data is independent of the finger's angle of rotation relative to the imaging device. Substep 405 adds the best possible candidates for a match to a list (usually 32) and sorts the list for the endpoints with the highest number of corresponding near neighbor data points.

Starting with the most likely endpoint that has a high degree of similarity between both maps, substep 410 sorts for near match candidates of the list of possible candidates for matches and confirms other possible candidates that confirm the angle and radius on both maps. There must be a number n of additional endpoint candidates at similar locations to proceed which adds the reference map to the candidate list. The list is preferably ordered from most likely to less likely. Substep 410 marks the point on the original ridge maps. This is a starting point to verify the two maps.

Substep 415 follows the current ridge, from corresponding endpoints, by moving a radius of r from the first point on each image (usually 3 to 5 pixels). Substep 415 continues incrementing along the current ridge at the same radius r and, with each such increment, substep 415 compares the distance to all the previous points so mapped on every ridge previously mapped. Upon mapping the entire ridge the first and last points define a mapped ridge and it is in this fashion which the ridge angularity measurements, substep 420, is made by comparing the angle of the entire ridge relative to another ridge similarly mapped.

Substep 425, as more ridges are mapped, verifies distances ridge to ridge, and substep 430 verifies ridge curvatures.

From each of substep 415 through substep 430, when a test fails, step 215 returns to step 415.

When an end of a ridge element is reached from stepping along one radius r at a time, a new ridge is needed to step along. The next ridge element to step along preferably is a ridge element physically located proximate to the ridge element previously mapped. Using the data points from each step of radius r found from the continuous stepping, two adjacent points are used to determine a line and a slope. From the first point, use the line between two points and the slope to calculate a line perpendicular to the line between the two points. Step out along the line extending perpendicular until a new ridge element is found or a max search radius is reached. This perpendicular search is used in substep 440.

Substep 440 performs a normalization function on the new point to verify it is a point on the ridge that is of equal distance from the points on the previous ridge step data and adjusts as needed. When a near ridge point is found, process 215 branches to substep 415 after substep 440. When no more near ridge elements are located, a new endpoint is referenced and substep 215 branches to substep 410 instead. Substep 440 is performed whenever additional data is needed.

Substep 215 repeats the process of stepping along the ridge in both directions at a radius r to gather new ridge data points.

As every successive new ridge is thus mapped, compare all points of the new ridge element to every previously found ridge data point between the two maps. As every successive new ridge element is thus mapped, compare the endpoints of the new ridge element for angular similarity between the two maps. As every successive new ridge element is thus mapped, compare the path curvature of both ridge elements by comparing the relative location of each point along the path to the endpoints of the ridge elements on both maps.

Substep 215 marks each ridge path as accepted. When using an 8 bit color depth, system 100 marks the mapped paths with a path ID. When a 1 bit color depth is used, system 100 uses an array list or a mirror image to mark the mapped ridge element paths. When no more neighboring ridges are found and/or successfully identified, an additional search of near cluster points is used to look for new endpoints that are suitably close to any ridge data already mapped as potential matched fingerprint regions.

To prevent a single ridge element spanning the ridge map but lacking sufficient information to offer suitable verification from causing a false acceptance, initial ridge elements identified must be within a radius of the midpoint of the first ridge element found. The use of points along the ridge elements at steps of radius r is important to the preferred embodiment. Their use allows distance checking with angular independence, relying instead on triangulation to confirm positional similarity between images.

Substep 435 aggregates successful comparisons and matches of ridge element pixels as they are verified (within tolerances) between a candidate reference map and the test map. In the preferred embodiment, tolerances exist for geographic correspondence between the maps. As a pixel is further from a reference, the tolerance is permitted to increase, with the tolerance actually a function of the separation distance. Other threshold levels may be used.

Substep 435 measures a quantity of matching pixels to determine correspondence. When more data is needed, substep 435 branches to substep 440. When a sufficient quantity ridge pixel data is matched, process 200 concludes with a successful match. System 100 issues the match signal, as well a quality of match signal which is a ratio of the number of matching pixels to the total number of ridge pixels available in the map.

That is, for a map having 100,000 pixels, 3% or 3,000 of which may be ridge pixels. When x percent, e.g., 10%, of the total number of ridge pixels of a test ridge map as compared to the ridge pixels of a candidate reference ridge map (i.e., 300 ridge pixels) correspond, substep 435 indicates a match by asserting a pass signal. Additionally, system 100 provides a signal indicating the ratio of the actual number of pixels matched to the total number of ridge pixels available for matching.

System 100 has a security level determined by the threshold levels, the quantity of ridge pixels to be matched, and the number/type of reference ridge maps available for matching. A ten percent pixel matching requirement produces a FAR of about 1/2000 with a FRR of less than 1/100. Different implementations and embodiments will likely have differing results, but system 100 may be set to the desired level of security (FAR with acceptable levels of FRR) by adjusting the comparison parameters. As "x" increases, the FAR improves rapidly to achieve virtually any desirable security level without a similar magnitude of change in the FRR.

Figure 5:
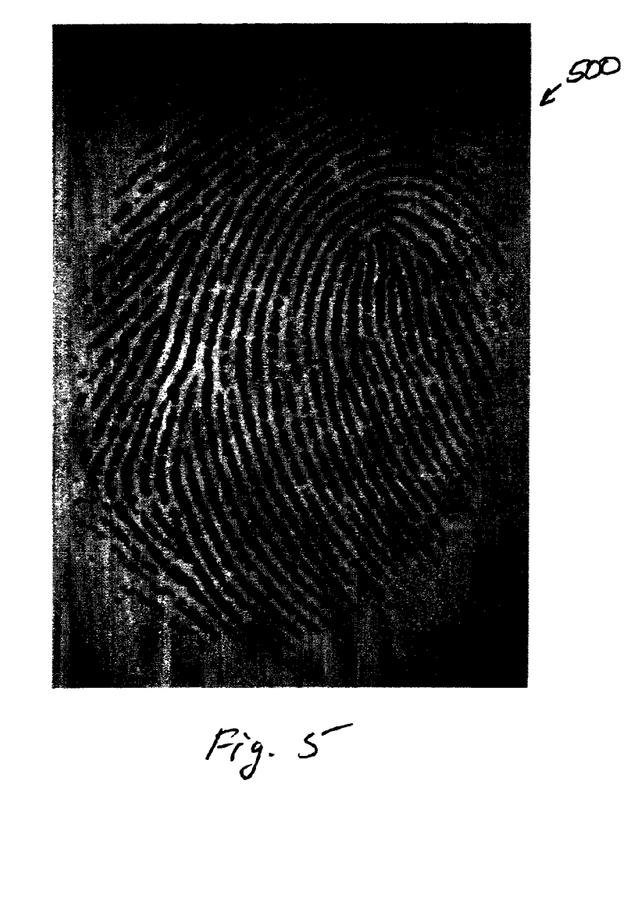
FIG. 5 is an image typical of an output from a fingerprint sensor.

FIG. 5 is an image 500 typical of an output from a fingerprint sensor, and of the type from which system 100 creates a ridge map. Ridge/furrow amplitude information is presented in eight-bit grayscale, with white having a value of "255" and black having a value of "0." Many parts of a ridge element will have values greater than or equal to 0, while furrows will have values less than or equal to 255. The ridge map production is important to both accurately and reproducibly generate ridge maps from fingerprint images. The ridge maps have feature points of interest that are typically endpoints of a ridge element. These features are important in the screening and matching, so reproducibility is important. A preferred embodiment for ridge map production introduces extra feature points of interest, such as when ridge elements merge or intersect, the ridge map will include an endpoint near the point of merger or intersection rather than simply join the ridge element lines.

Figure 6:
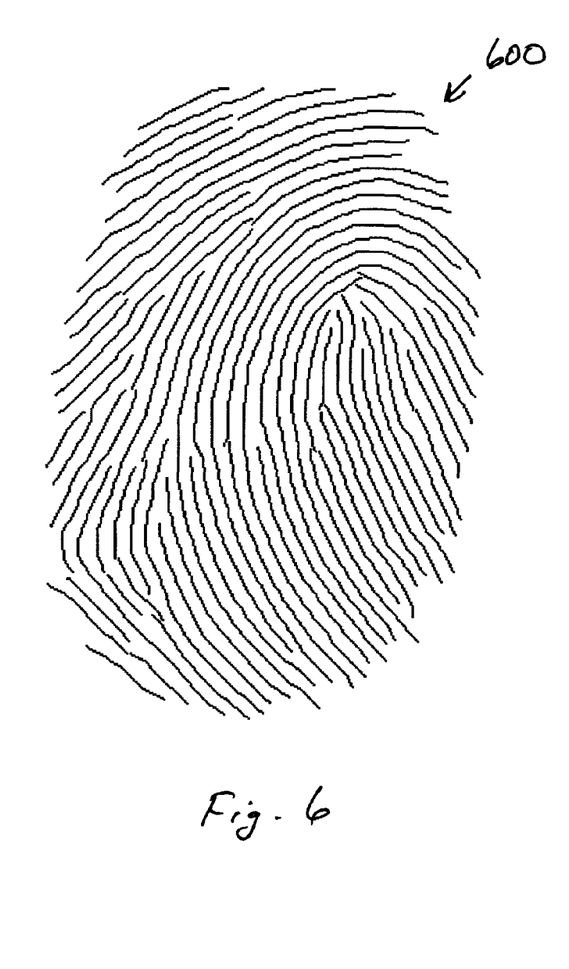
FIG. 6 is a ridge map extracted from the image shown in FIG. 5.

FIG. 6 is a ridge map 600 extracted from image 500 shown in FIG. 5. Map 600 is a binary map in which ridges are depicted as black pixels and non-ridges as white pixels. Map 600 is qualified by system 100 to ensure that it contains a sufficient amount of identifiable data in proper proportion to be able to securely use the map for verification. Map 600 may be scaled from the original image size to reduce memory requirements while potentially sacrificing some accuracy. Map 600 is shown at a ratio of 1:1 with image 500.

Part of the security feature used in matching ridge element pixels between two ridge maps. As the quantity of ridge pixel data that corresponds between the maps increases, the more reliable that a match becomes.

Figure 7:
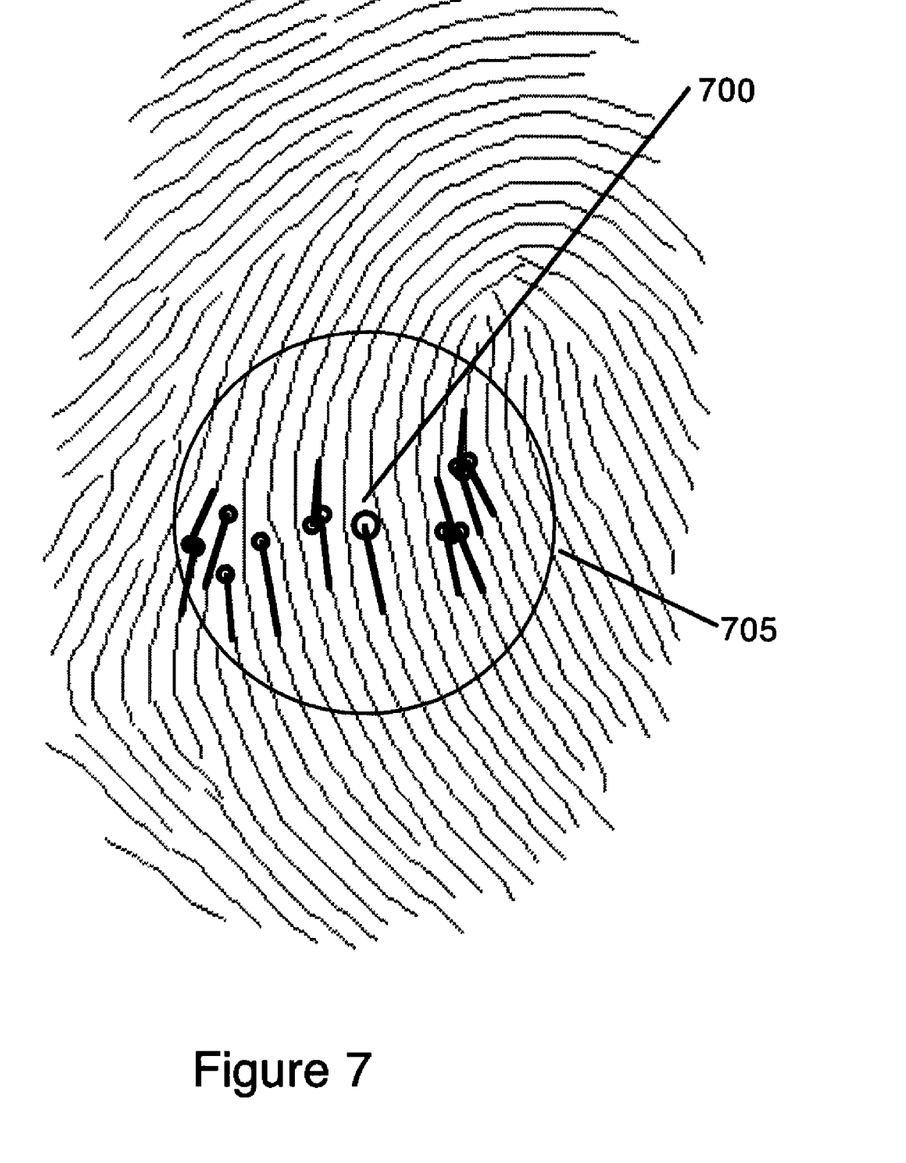
FIG. 7 is an illustration of feature points of interest about a primary point of interest 700 in the ridge map of FIG. 6.

FIG. 7 is an illustration of feature points of interest about a primary point of interest 700. System 100 locates a primary point of interest (e.g., an endpoint of a ridge element) and defines a radius about this primary point of interest. All secondary points of interest (e.g., other endpoints of ridge elements) are located and defined in polar coordinates based upon the location of the point of interest and the angle of the ridge element connected to the point of interest. The set of points of interest within the radius is called a cluster 705.

Figure 8:
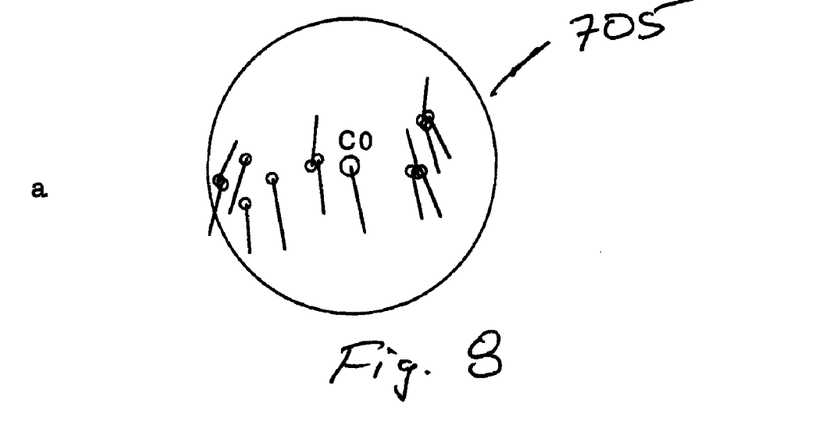
FIG. 8 is a detailed illustration of a cluster from the points of interest of FIG. 7.

FIG. 8 is a detailed illustration of cluster 705 shown in FIG. 7. The arrangement of points of interest around a central point designated as the cluster center (C0). To process the cluster information, the ridge element information is not used once the feature points of interest are found (until the ridge map comparisons are made against the set of candidate reference ridge maps).

Figure 9:
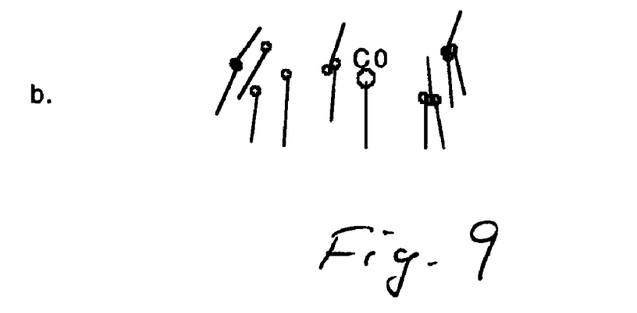
FIG. 9 is a detailed illustration of the cluster shown in FIG. 8 normalized for rotational independence.

FIG. 9 is a detailed illustration of cluster 705 shown in FIG. 8 normalized for rotational independence. System 100 effectively rotates the points of interest around cluster center C0 such that the direction of the ridge element at the cluster center is of angle zero. Note that system 100 does not rotate the image or ridge map, but mathematically system 100 normalizes the data in a way that all data is relative to the cluster's center C0.

Figure 10:
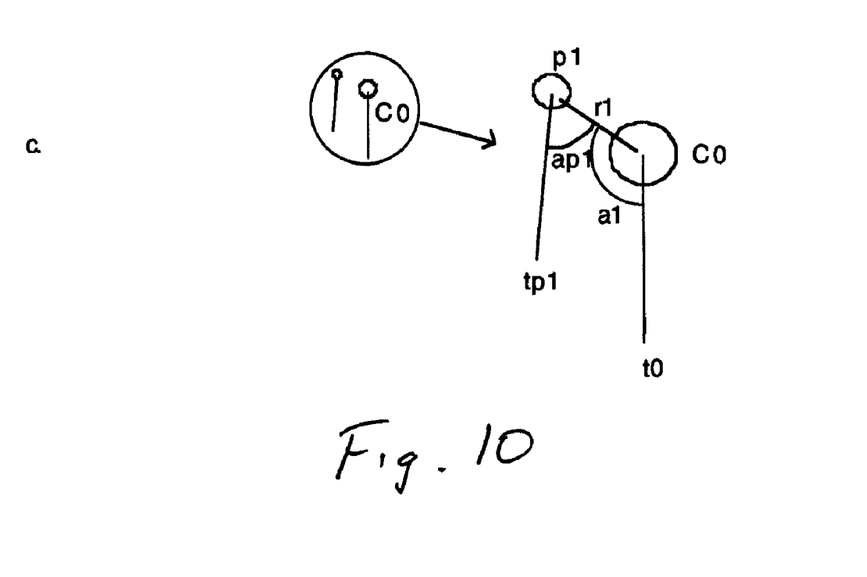
FIG. 10 is a detailed illustration of a portion of the cluster shown in FIG. 9 illustrating the recorded relationships among feature points of interest.

FIG. 10 is a detailed illustration of a portion of cluster 705 shown in FIG. 9 illustrating the recorded relationships among feature points of interest. Beginning at cluster center (C0), system 100 locates the nearest point of interest (p1). Relative to C0 is p1 at a radius of r1. The angle a1 describes the location of p1 relative to point C0 with ridge in the direction of t0. Using tp1 an angle ap1 is calculated with reference to the radius r1 going to C0. The direction of tp1 is now calculated in relation to t0.

Likewise all of the feature points of interest that define each cluster are also defined. Matching of clusters is performed by incrementing through a list of feature points surrounding a cluster center by looking for near points with similar radii and ridge angles.

With the data normalized to radii and a ridge-to-ridge angle, there is no mention of/reference to the orientation of a cluster to an original orthogonal axis. This allows system 100 to search for matches without rotational limits.

Figure 11:
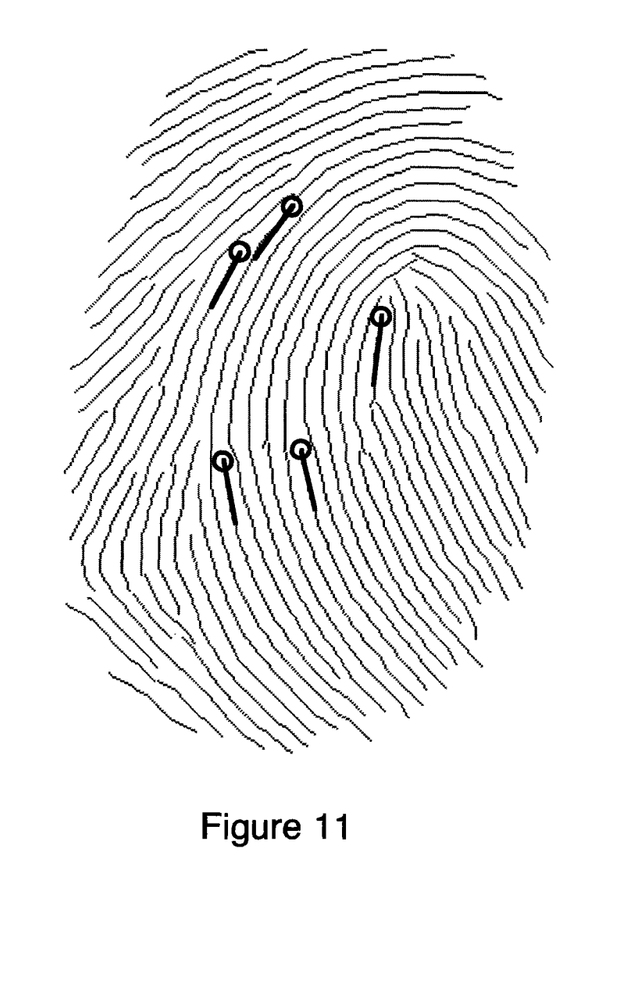
FIG. 11 is an illustration of a set of clusters identified in a ridge map.

FIG. 11 is an illustration of a set of clusters identified in a ridge map. Each of the identified feature points of interest is a cluster center C0 of its own cluster, the clusters having a measurable relationship among themselves.

Figure 12:
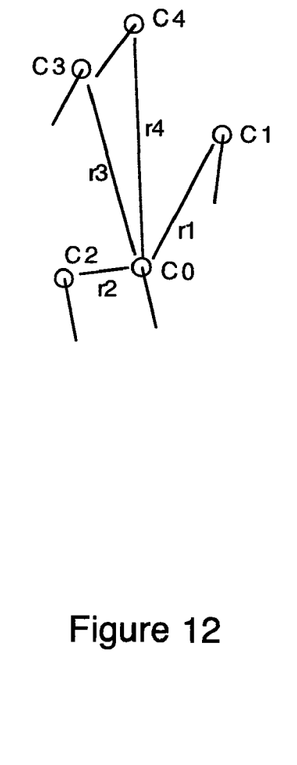
FIG. 12 is a detailed illustration of the recorded relationships among the set of clusters shown in FIG. 11.

FIG. 12 is a detailed illustration of the recorded relationships among the set of clusters shown in FIG. 11. System 100, using the cluster data, compares potential matched clusters according to radius from the potential starting point cluster center to confirm other clusters located at corresponding radii and ridge angles. After confirmation of additional clusters, system 100 proceeds to ridge marking.

Figure 13:
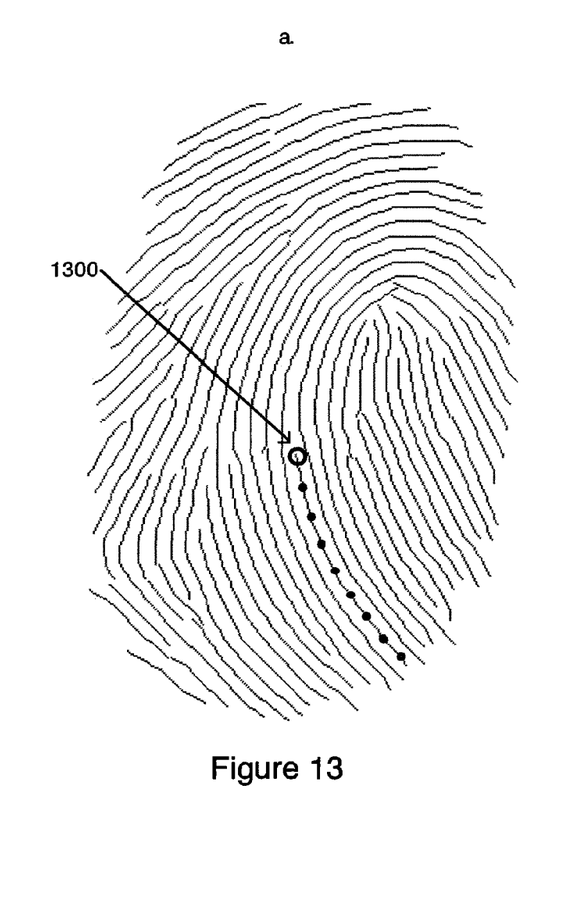
FIG. 13 is an illustration of a step of a mapping of local ridge information from a primary point of interest in a ridge map.

FIG. 13 is an illustration of a step of a mapping, in a ridge map, of local ridge information of a ridge element from a primary point of interest 1300. From the starting point of the cluster center, step along the ridge marking the ridge every x radius on both images.

Figure 14:
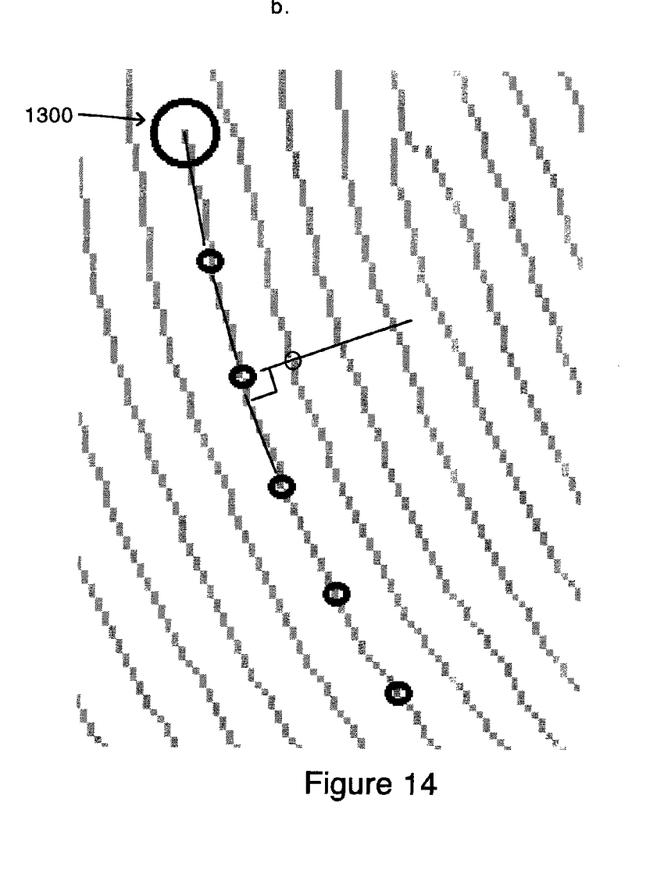
FIG. 14 is an illustration of a step of a mapping of local ridge information of a neighboring ridge element from a ridge element containing the primary point of interest.

FIG. 14 is an illustration of a step of a mapping of local ridge information for a neighboring ridge element from a ridge element containing primary point of interest 1300. In looking for near neighbor ridges, system 100 increments a list of marked points along ridges so far marked and extends perpendicular to one of the ridges in search of a neighboring ridge.

Figure 15:
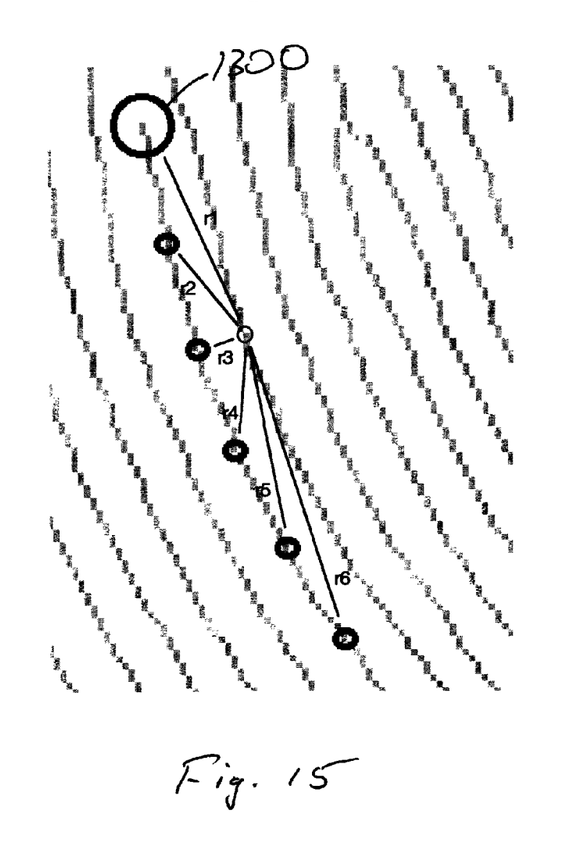
FIG. 15 is a detailed illustration of recorded relationships among identified points along a primary ridge element and a neighboring ridge element.

FIG. 15 is a detailed illustration of recorded relationships among identified points along a primary ridge element and a recently found neighboring ridge element from FIG. 14. When a neighboring ridge is found, normalize an initial point with the previously marked ridge points from previously mapped ridge elements. System 100 takes a radius from each previously marked point of each previously marked ridge element to the initial point. These radii are checked for correspondence in the test ridge map and the specific one candidate reference ridge map being evaluated.

Figure 16:
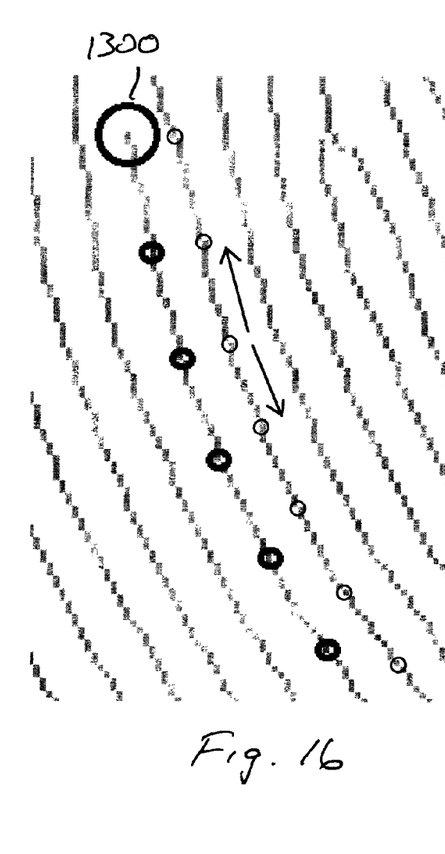
FIG. 16 is a detailed illustration of point identification along a neighboring ridge element.

FIG. 16 is a detailed illustration of point identification along a neighboring ridge element. Similarly to previous ridge elements, system 100 follows a new ridge element in both directions as it marks the newly found ridge. System 100 attempts to locate corresponding points in both ridge maps.

Figure 17:
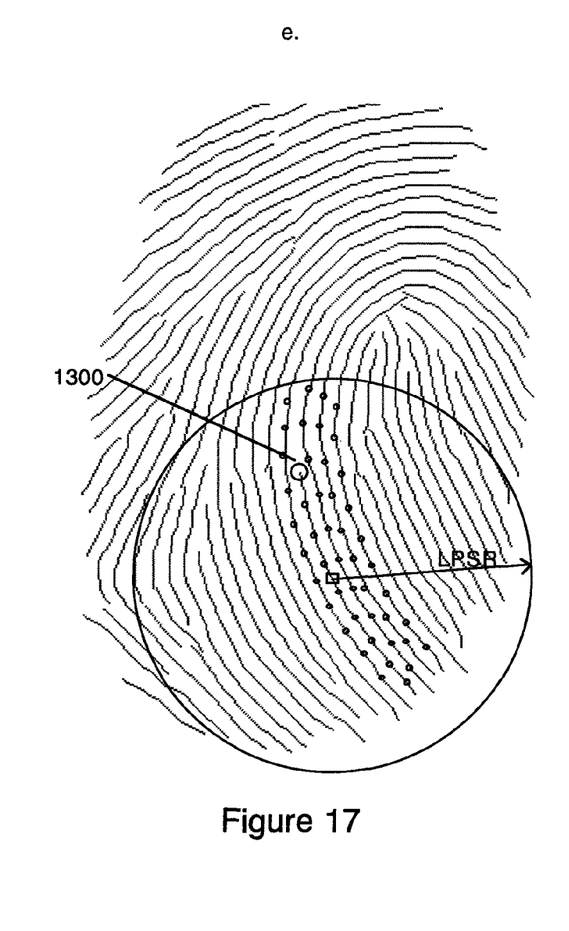
FIG. 17 is an illustration of identified ridge element points around a primary point of interest within a radius from a reference point of the ridge map.

FIG. 17 is an illustration of identified ridge element points around a primary point of interest within a radius from a reference point of the ridge. Across the entire ridge map, system 100 continues to map ridge elements and locate new neighboring ridge elements to previously determined ridge elements, up to a limit: the Local Point Search Radius (LPSR). Features and ridge elements at a periphery of a ridge map are less reliable than features/elements nearer the center of a ridge map. System 100 preferentially locates and marks ridge elements nearer a map center.

Figure 18:
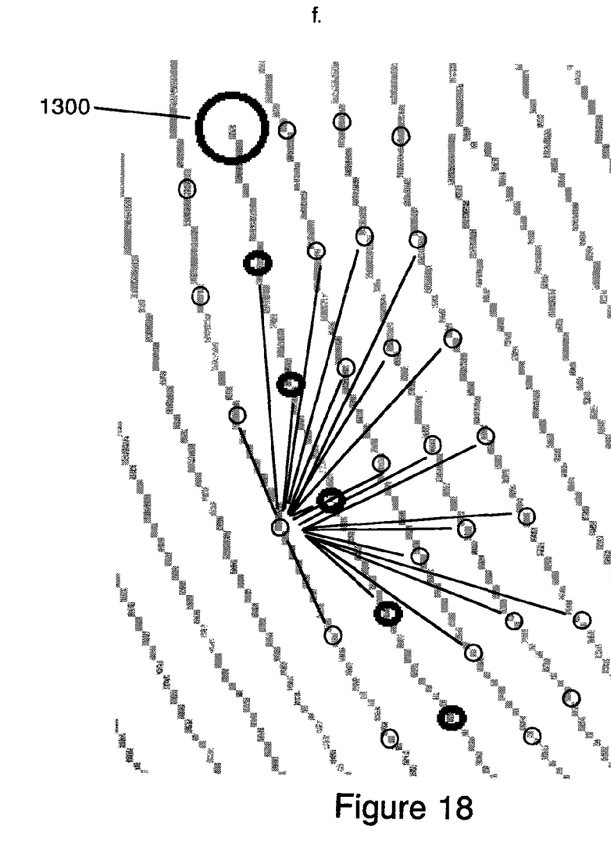
FIG. 18 is an illustration of measured local ridge information used to determine a comparison result of the fingerprint verification system.

FIG. 18 is an illustration of measured local ridge information used to determine a comparison result of the fingerprint verification system. After each new ridge is marked, system 100 uses a local group check to confirm by triangulation of similar radii that the newly marked ridge is similar on both images. The multitude of marked points on each ridge element and neighboring ridge elements represent the local ridge information that must correspond for system 100 to assert a match signal. The quantity of marked points are all pixel ridge elements similar to both images.

Although embodiments of the invention have been described primarily with respect to a fingerprint verification system, any type of fingerprint analysis system may benefit from features of the invention. Other image comparison/processing products such as, for example, retinal scans and machine vision, etc., may similarly benefit from features of the invention.

One of the preferred implementations of the present invention is as a routine in an operating system made up of programming steps or instructions resident in a memory of a computing system shown in FIG. 1, during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, C#, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

What is claimed is:

1. A computer program product including a non-transitory computer readable medium carrying program instructions for verifying a fingerprint when executed using a computing system, the executed program instructions executing a method, the method comprising:
   comparing local ridge data surrounding one or more points of interest of a test ridge map derived from the fingerprint with local ridge data surrounding corresponding one or more points of interest of each of one or more test ridge maps in a set of ridge maps; and
   asserting a comparison signal responsive to a correspondence between said local ridge data of said test ridge map and said local ridge data from one or more ridge maps of said set of ridge maps.

2. A method, the method comprising:
   comparing local ridge data surrounding one or more points of interest of a test ridge map derived from a fingerprint-under-test with local ridge data surrounding corresponding one or more points of interest of each of one or more test ridge maps in a set of ridge maps; and
   asserting a comparison signal responsive to a correspondence between said local ridge data of said test ridge map and said local ridge data from one or more ridge maps of said set of ridge maps wherein the method is performed using a computer or processor.

3. A system, comprising:
   means for comparing local ridge data surrounding one or more points of interest of a test ridge map derived from a fingerprint-under-test with local ridge data surrounding corresponding one or more points of interest of each of one or more test ridge maps in a set of ridge maps; and
   means for asserting a comparison signal responsive to a correspondence between said local ridge data of said test ridge map and said local ridge data from one or more ridge maps of said set of ridge maps.

4. An apparatus, comprising:
   a fingerprint source for producing a test image of a fingerprint-under-test; and
   a processing unit, coupled to said fingerprint source, for:
   comparing local ridge data surrounding one or more points of interest of a test ridge map derived from said test image with local ridge data surrounding corresponding one or more points of interest of each of one or more test ridge maps in a set of ridge maps; and
   asserting a comparison signal responsive to a correspondence between said local ridge data of said test ridge map and said local ridge data from one or more ridge maps of said set of ridge maps.

* * * * *